United States Patent [19]  
Kondo et al.

[11]  4,044,046  
[45]  Aug. 23, 1977

[54] METHOD FOR RECOVERING POLYOL FROM A POLYURETHANE

[75] Inventors: Osamu Kondo; Torao Hashimoto; Hajime Hasegawa, all of Yokohama, Japan

[73] Assignee: Bridgestone Tire Company Limited, Tokyo, Japan

[21] Appl. No.: 600,681

[22] Filed: July 31, 1975

[30] Foreign Application Priority Data

Aug. 2, 1974  Japan ................................ 49-87968

[51] Int. Cl.$^2$ .......................................... C07C 125/06
[52] U.S. Cl. .............................................. 260/471 C
[58] Field of Search ........... 260/481 C, 481 B, 471 C, 260/468 E, 2.3

[56] References Cited  
U.S. PATENT DOCUMENTS 3,632,530  11/1972  Kinoshita ........................ 260/471 C Primary Examiner—Jane S. Myers  
Attorney, Agent, or Firm—Sughrue, Rothwell, Mion, Zinn and Macpeak

[57] ABSTRACT

A method for recovering polyol from a polyurethane comprises dissolving the polyurethane in a specific aliphatic diol and heating the dissolved polyurethane in the presence of a halogenated ester of phosphoric acid to recover the polyisocyanate used for the production of the polyurethane as a solid form and the polyol used for the production of the polyurethane together with the polyol having urethane bond formed by reaction with the aliphatic diol as a liquid.

6 Claims, 2 Drawing Figures

METHOD FOR RECOVERING POLYOL FROM A POLYURETHANE

BACKGROUND OF THE INVENTION

1. Field of the Invention

The present invention relates to a method for recovering the polyol, which has been supplied for the production of a polyurethane, efficiently by means of a particular decomposing agent.

2. Description of the Prior Art

Recently, organic compounds have been variously discussed as public nuisances and a polyurethane is one such material. Accordingly, various technics for decomposing the polyurethane have been developed.

Almost all technics heretofore proposed rely upon a conversion of the reversible thermal dissociation reaction of a large number of urethane bonds, urea bonds and the like present in the polyurethanes into a non-reversible reaction by addition of amine, dialkanolamine and the like. In general, the main starting materials of flexible polyurethane foams are polyol and tolylenediisocyanate, so that when polyurethane foams are decomposed, the polyol and tolylenediamine and derivatives thereof are formed. The decomposed liquid separates substantially into two layers, the upper layer of which is the polyol and the lower layer of which is the diamines but the diamines are dissolved to a fair extent in the polyol and the diamines in the lower layer form paste, so that the separation of both of the layers is very difficult. Even if both of the layers are separated, it is expensive to purify the polyol by further separating the diamines from the polyol, so that this process is not commercially preferable. Thus, it is quite expensive to reuse the polyol recovered through the decomposition as the starting material for a polyurethane and further when the unpurified polyol is used as the starting material, the dissolved amines act as a catalyst for the reaction system of the polyol and polyisocyanate and hence it becomes difficult to control the reaction in production of the polyurethane polymer.

SUMMARY OF THE INVENTION

An object of the present invention is to provide a novel method by which various drawbacks of the conventional technic are obviated and the polyol can be efficiently recovered.

The present invention provides a method for recovering polyol from polyurethanes which comprises dissolving a polyurethane in an aliphatic diol having a molecular weight of about 400-3000 and a boiling point of above 180° C and then decomposing the dissolved polyurethane by heating at a temperature of 170°-250° C in the presence of a halogenated ester of phosphoric acid to precipitate the polyisocyanate used for the production of the polyurethane as a solid amine derivative of phosphoric acid and to recover the polyol used for the production of the polyurethane together with the polyol having a urethane bond formed by the reaction with the above described aliphatic diol as a liquid.

BRIEF DESCRIPTION OF THE ACCOMPANYING DRAWINGS

For a better understanding of the invention, reference is taken to the accompanying drawings, wherein FIG. 1 is an infrared absorption spectrum of the polyol used as the starting material for the production of the polyurethane; and FIG. 2 is an infrared absorption spectrum of the upper layer liquid obtained by the decomposition of the polyurethane.

DETAILED DESCRIPTION OF THE INVENTION

Figure 1:
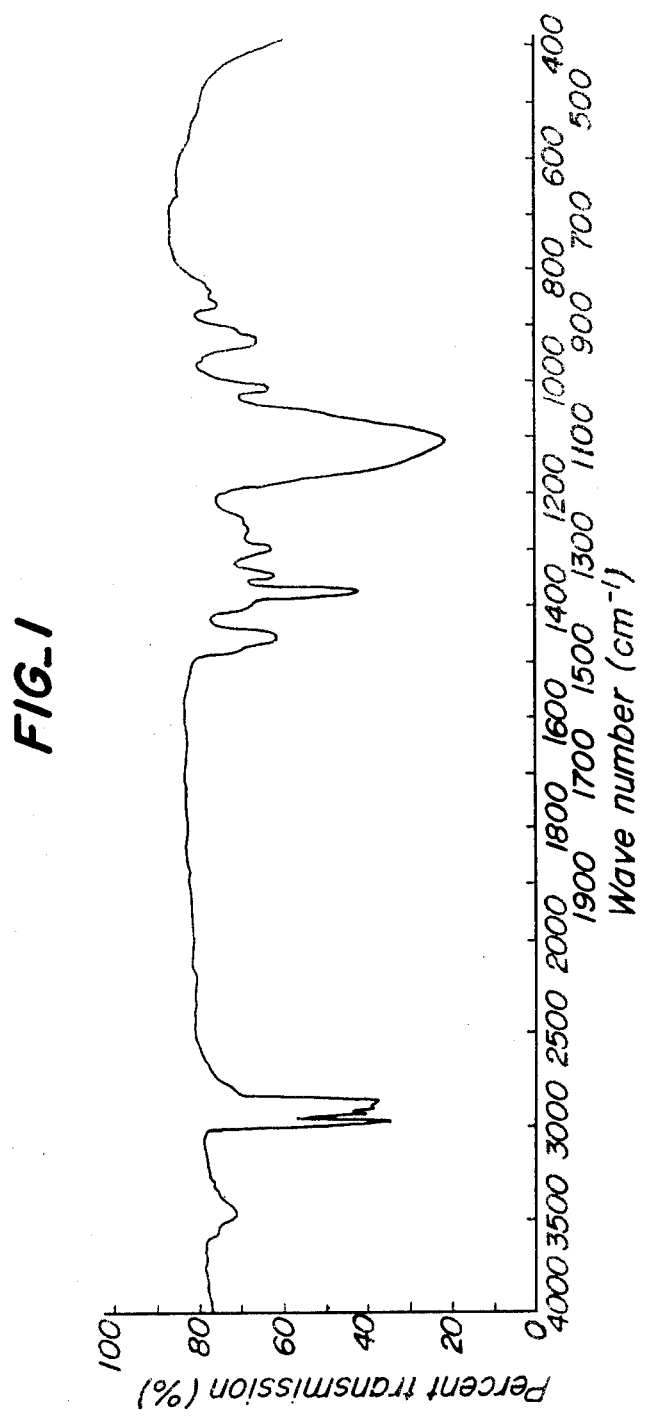

The reaction of the present invention is presumed to be as follows:

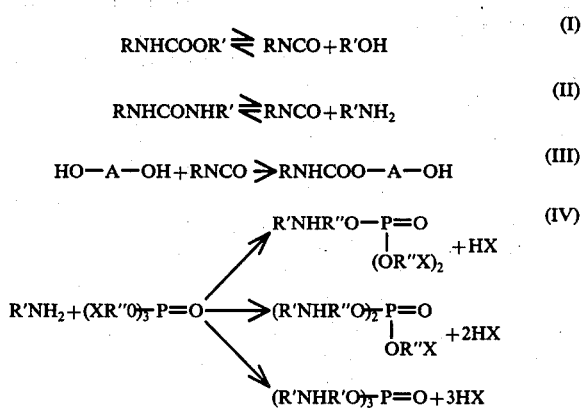

Namely, the urethane bond in the polyurethane is dissociated into the isocyanate (RNCO) and the polyol (R'OH), which are the original starting materials (equation I).

The urea bond in the polyurethane is dissociated into the isocyanate (RNCO) and the polyamine (R'NH$_2$) (equation II).

The isocyanate (RNCO) dissociated in the equations I and II reacts with the aliphatic diol to form the polyol having the urethane bond (equation III).

The polyamine (R'NH$_2$) in the equation II reacts with the halogenated ester of phosphoric acid and various solid amine compounds of phosphoric acid precipitate as shown in equation IV.

Accordingly, the recovered liquid composition is considered to be a mixture of R'OH, RNHCOOAOH and the unreacted HO—A—OH.

The aliphatic diols to be used in the present invention have a molecular weight of about 400-3000 and a boiling point of about 180° C and include polyoxypropylene glycol, polyoxypropylene-polyoxyethylene glycol and polyoxybutylene glycol and any one of them may be used as the starting material for the polyurethane foam. Among them, polyoxypropylene glycol is the typical embodiment.

In the present invention, aliphatic diols having a molecular weight of less than 400, such as ethylene glycol, propylene glycol, 1,4butane diol and the like can not be used, because it has been found that when such a low molecular weight diol is used, the decomposed product becomes one or two layers and in the case of one layer, separation is very troublesome and in the case of two layers, the lower layer does not become solid as in the present invention but becomes a viscous liquid and separation is very difficult. Furthermore, aliphatic triols are not used, because they are unsuitable for recovery of the decomposed products. These facts are shown in the comparative examples described hereinafter but in any case, the decomposed product does not yield the solid precipitate and even if the decomposed product separates into two layers, the lower layer is a very viscous liquid and separation is very difficult.

As the halogenated esters of phosphoric acid to be used in the present invention, mention may be made of tris(chloroethyl) phosphate, tris(dichloropropyl) phosphate, tris(chloropropyl) phosphate, bis[2,3-dibromopropyl] phosphate, bis(chloropropyl) monophenyl phosphate and the like and tris(chloroethyl) phosphate is particularly preferable.

The halogenated esters of phosphoric acid have been often already compounded in polyurethanes as a flame retardant. In this case, the addition of the halogenated ester of phosphoric acid can be omitted in the heat decomposition step.

In the heat decomposition step according to the present invention, it is preferable to use the aliphatic diol and the halogenated ester of phosphoric acid in a weight ratio of about 1/1-20/1. When the amount of the aliphatic diol is increased, the decompositon reaction becomes rapid but the cost increases. On the other hand, when the amount of the diol is decreased, the decomposition reaction becomes slow.

When the amount of the halogenated ester of phosphoric acid increases, the decomposition reaction proceeds but the acid value of the recovered polyol becomes high and when such polyol is reused for the production of a polyurethane, there is a problem in the formation of foam.

Accordingly, the ratio of the aliphatic diol to the halogenated ester of phosphoric acid is used within the range as described above but the preferable range is about 2.5/1-10/1.

In the present invention, the halogenated ester of phosphoric acid present in the heating system is thermally decomposed to form a phosphoric acid compound, which decomposes the polyurethane acidically, so that the decomposition rate becomes rapid. Furthermore, the urethane bond and the urea bond in the polyurethane are thermally dissociated and the dissociated product reacts with the aliphatic diol of the solvent and further the formed amine reacts with the halogenated ester of phosphoric acid, whereby the polyurethane is finally decomposed into the liquid polyol and the crystalline solid amine derivative of phosphoric acid and the separation becomes very easy. The amine derivative is not substantially dissolved in the separated and recovered polyol, so that the recovered polyol can be reused for the production of the polyurethane without purifying the polyol.

The aliphatic diols to be used in the present invention can be used as such as the starting material of the polyurethane so that the recovered polyol admixed with the aliphatic diol can be reused for the production of the polyurethane without effecting purification. Of course, the recovered polyol can be used by mixing it with the fresh polyol. On the other hand, it is considered that the amine derivative of phosphoric acid precipitated as a solid can be utilized as a fertilizer.

The following examples are given for the purpose of illustration of this invention and are not intended as limitations thereof. Furthermore, the polyurethanes supplied to the decomposition in the following examples were as follows.

A. Flexible polyurethane foam A.

A flexible polyurethane foam A was produced as follows using the composition as shown in the following Table 1.

The obtained foam had the following physical properties.

| | |
|---|---|
| Specific gravity | 0.025 |
| Harndess at 25% compression | 12.5 Kg/JIS |
| Tensile strength | 1.8 Kg/cm$^2$ |
| Elongation | 250% |
| Compression set (50% compression at 70° C for 22 hours) | 7.0% |

B. Flame resistant polyurethane foam B.

A flexible polyurethane foam B was produced as follows using the composition as shown in the following Table 2. The obtained foam had been previously compounded with tris(dichloropropyl) phosphate as a flame retardant and in the physical properties, the specific gravity was 0.023 and the hardness was 13.0 kg/JIS.

Table 1

| | | Parts by weight |
|---|---|---|
| Triol molecular weight 3000 hydroxyl value 56 (glycerin base, propylene glycol adduct) | | 100 |
| Catalyst | stannous octoate | 0.3 |
| Catalyst | triethylenediamine | 0.15 |
| Foaming agent | water | 4.0 |
| Foaming regulator (made by UCC Co., Ltd. silicone oil L-520) | | 1.1 |
| Tolylenediisocyanate (T-80) | | 50 |

Table 2

| | | Parts by weight |
|---|---|---|
| Triol molecular weight 3000 hydroxyl value 56 (glycerin base propylene glycol adduct) | | 50 |
| Triol molecular weight 3000 (made by DAIICHI KOGYO SEIYAKU K.K. propylan 333) | | 50 |
| Tris(dichloropropyl)phosphate | | 25 |
| Catalyst | stannous octoate | 0.3 |
| Catalyst | triethylenediamine | 0.15 |
| Foaming agent | water | 5.0 |
| Foaming agent | Freon-11 | 2.0 |
| Foaming regulator (made by UCC Co., Ltd. (silicone oil L-520) | | 1.5 |
| Tolylenediisocyanate (T-80) | | 61 |

EXAMPLE 1

A flask of a capacity of 3l equipped with a stirrer was placed in a mantle heater. Into the flash were charged 500 g of PPG Diol 400 (diol made by Mitsui Toatsu Co., molecular weight: 400) and 100 g of tris(chloroethyl) phosphate (flame retardant, made by Daihachi Kagaku Co.), and the resulting mixture was heated at 195°±5° C while stirring. Then, 500 g of small pieces of flexible polyurethane foam A was added to the solution at a rate of 3-4 g per minute and dissolved therein. The resulting solution was kept at 195±5° C for about 40 minutes while stirring.

Figure 2:
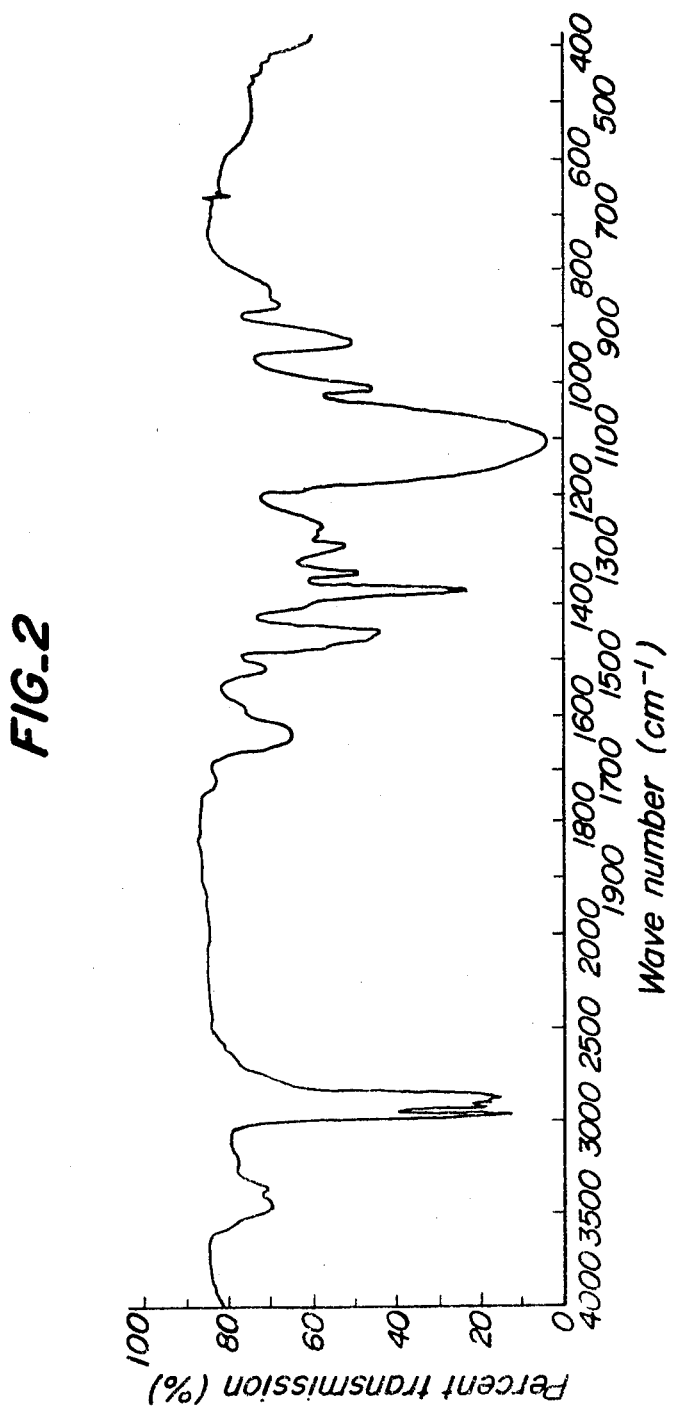

When the reaction product was cooled to room temperature (about 26° C), the product was separated into an upper layer of a reddish brown liquid and a lower layer of a black solid. The upper layer liquid weighed 836 g and the lower layer black solid weighed 126 g. The following Table 3 shows the results of analysis of the upper layer liquid and the lower layer black solid. FIG. 1 is an infrared absorption spectrum of the polyol used for the production of polyurethane foam A, and an adsorption assigned to the —C—O—C— bond is observed at 1100 cm$^{-1}$ and that assigned to the —CH$_2$ bond is observed at 2900-3000 cm$^{-1}$. Substantially the same spectrum is observed in polyether polyols. FIG. 2 is an infrared absorption spectrum of the upper layer liquid, which is a mixture of R'OH, RNHCOOA—OH and HO—A—OH as described above. In the spectrum of FIG. 2, an absorption assigned to the urea bond or amide bond is observed at 1620-1640 cm$^{-1}$ and that assigned to the urethane carbonyl bond is observed at 1720-1730 cm$^{-1}$, and other absorptions are the same as those in FIG. 1. That is, it is clear that the upper layer liquid contains a polyol having a urethane bond. It has been found from the infrared absorption spectra of FIG. 1 and FIG. 2 that the upper layer liquid is a mixture of the polyol used in the production of the foam, a polyol having a urethane bond formed by the reaction of the aliphatic diol with the dissociated isocyanate, and an unreacted aliphatic diol, as presumed by the above equations (I) and (II).

Analysis of the lower layer black solid showed that the solid contained a large amount of crystalline and hygroscopic phosphorus compound.

Table 3

| | Viscosity (cp) | pH | Hydroxyl value (mg KOH/g) | Acid value (mg KOH/g) | Aliphatic primary amine value (mg KOH/g) |
|---|---|---|---|---|---|
| Reddish brown upper layer liquid | 1025 (25° C) | 5.8 | 170.2 | 10.2 | 9.4 |
| Black solid | — | — | — | — | 251.2 |

Then, a flexible polyurethane foam was prepared by using the recovered polyol without purification. The following Table 4 shows the compounding formulation and the physical properties of the resulting polyurethane foam. As seen from Table 4, the recovered polyol as such can be used again as a starting material for the production of a polyurethane and the physical properties of the resulting polyurethane foam are equal to those of the foam prepared by using fresh polyol.

Table 4

| | | Parts by weight |
|---|---|---|
| Recovered polyol | | 40 |
| Triol (same as described in Table 1) | | 60 |
| Catalyst | stannous octoate | 0.2 |
| Catalyst | triethylenediamine | 0.15 |
| Foaming agent | water | 4.0 |
| Foaming agent | Freon-11 | 7.0 |
| Foaming regulator | Silicone Oil L-520 | 1.5 |
| Tolylenediisocyanate (T-80) | | 141.6 |
| Physical properties | | |
| Specific gravity | | 0.023 |
| Hardness | | 10.0 Kg/JIS |
| Tensile strength | | 1.8 Kg/cm$^2$ |
| Elongation | | 200% |
| Compression set | | 8.0% |

EXAMPLES 2-5

In the same manner as described in Example 1, 100 parts by weight of the above described flexible polyurethane foam A was decomposed to recover the polyol. The following Table 5 shows the decomposition conditions, the decomposition products and the results of the analysis of the products. It can be seen from Table 5 that the upper layer liquid of the decompositon product is a polyol and the lower layer solid thereof is amine derivative. The polyol of the upper layer liquid as such was able to be used for the production of a polyurethane in a manner similar to Example 1.

Table 5

| | Example 2 | Example 3 | Example 4 | Example 5 |
|---|---|---|---|---|
| Aliphatic diol (parts by weight) | | | | |
| PPG Diol 1000 (trademark, made by Mitsui Toatsu Co., M.W. : 1,000) | 100 | 100 | 0 | 0 |
| Actcol 21-56* (trademark, made by Takeda Yakuhin Co., M.W. : 2,000) | 0 | 0 | 100 | 0 |
| Hiflex D3000* (trademark, made by Daiichi Kogyo Seiyaku Co., M.W. : 3,000) | 0 | 0 | 0 | 100 |
| Halogenated ester of phosphoric acid | | | | |
| Tris(dichloropropyl) phosphate | 20 | 0 | 0 | 0 |
| Tris(chloroethyl) phosphate | 0 | 20 | 20 | 20 |
| Decomposition temperature (° C) | 198 | 195 | 195 | 196 |
| Decomposition time (min.) | 25 | 30 | 27 | 25 |
| Decomposition product : Upper layer | Reddish brown liquid | Reddish brown liquid | Reddish brown liquid | Reddish brown liquid |
| Lower layer | Black solid | Black solid | Black solid | Black solid |
| Upper layer liquid (polyol) | | | | |
| Hydroxyl value (mg KOH/g) | 86 | 87.6 | 58.5 | 71.6 |
| pH | 5.4 | 5.2 | 5.4 | 5.9 |
| Viscosity (cp) | 450 (28.2° C) | 1200 (26° C) | 2105 (26° C) | 1885 (25° C) |
| Acid value (mg KOH/g) | 8.5 | 11.5 | 7.7 | 4.0 |
| Aliphatic primary amine value (mg KOH/g) | 10.2 | 13.0 | 11.5 | 9.9 |
| Lower layer black solid | | | | |
| Aliphatic primary amine value (mg KOH/g) | 205.3 | 195.2 | 220.5 | 215.5 |

*Polyether prepared from polypropylene oxide.

EXAMPLE 6

In the same apparatus as used in Example 1, 500 g of flame-resistant polyurethane foam B was added to 500 g of PPG Diol 100 at a temperature of 195±5° C at a rate of 3-4 per minute while stirring and was dissolved therein. After the polyurethane foam was completely dissolved, the reaction system was kept at 195±5° C for about 50 minutes while stirring. In this reaction, since polyurethane foam B already contained tris(dichloropropyl) phosphate, a halogenated ester of phosphoric acid was not additionally added. When the reaction product was cooled to room temperature, the reaction product was separated into an upper layer of a reddish brown liquid and a lower layer of a black solid. The upper layer liquid weighed 825 g and the lower layer black solid weighed 115 g. The following Table 6 shows the results of analysis of the two layers of the reaction product.

Table 6

|  | Viscosity (cp) | pH | Hydroxyl value (mg KOH/g) | Acid value (mg KOH/g) | Aliphatic primary amine value (mg KOH/g) |
|---|---|---|---|---|---|
| Upper layer Reddish brown liquid | 475 (25° C) | 4.2 | 174.5 | 13.2 | 12.0 |
| Lower layer black solid | — | — | — | — | 260.3 |

The recovered polyol was used again for the production of a polyurethane foam using the same formulation as shown in Example 1. The resulting foam had a specific gravity of 0.025, a hardness of 11.0 Kg/JIS, a tensile strength of 1.7 Kg/cm², an elongation of 210% and a compression set of 9.5%.

EXAMPLES 7-9

Using the same procedure as described in Example 1, 100 parts by weight of flame-resistant polyurethane foam B was decomposed under the conditions shown in the following Table 7. The obtained results are shown in Table 7.

Table 7

|  | Example 7 | Example 8 | Example 9 |
|---|---|---|---|
| Aliphatic diol (parts by weight) |  |  |  |
| PPG Diol 1000 (trademark, made by Mitsui Toatsu Co., M.W. : 1,000) | 100 | 0 | 0 |
| Actcol 21-56* (trademark, made by Takeda Yakuhin Co., M.W. : 2,000) | 0 | 100 | 0 |
| Hiflex D 3000* (trademark, made by Diichi Kogyo Seiyaku Co., M.W. : 3,000) | 0 | 0 | 100 |
| Decomposition temperature (° C) | 195 | 195 | 195 |
| Decomposition time (min.) | 30 | 28 | 28 |
| Upper layer liquid (polyol) |  |  |  |
| Hydroxyl value (mg KOH/g) | 75.1 | 67.5 | 57.5 |
| pH | 4.9 | 5.2 | 5.3 |
| Viscosity (cp) | 396 (27° C) | 510 (25° C) | 620 (25.5° C) |
| Acid value (mg KOH/g) | 8.2 | 3.1 | 2.4 |
| Aliphatic primary amine value (mg KOH/g) | 13.2 | 18.2 | 14.9 |
| Lower layer black solid |  |  |  |
| Aliphatic primary amine value (mg KOH/g) | 212.2 | 200.3 | 157.5 |

*Polyether prepared from polypropylene oxide

COMPARATIVE EXAMPLE 1

The decomposition reaction of Example 1 was repeated, except that tris(chloroethyl) phosphate was not used. The decomposition product was formed into a muddy layer (one layer), and no solid precipitate was formed.

COMPARATIVE EXAMPLE 2

The decomposition reaction of Comparative Example 1 was repeated, except that Hiflex D 1200 was used instead of PPG Diol 400. The decomposition product was formed into a muddy layer (one layer) in a similar manner to Comparative Example 1, and no solid precipitate was formed. As can be seen from Comparative Examples 1 and 2, when a flexible polyurethane foam is decomposed in the absence of a halogenated ester of phosphoric acid, no solid precipitate is formed. This shows that the halogenated ester of phosphoric acid is an essential compound to be used in the method of the present invention.

COMPARATIVE EXAMPLES 3 AND 4

The decomposition reaction of Example 1 was repeated, except that propylene glycol (molecular weight: 76.10) or 1,5-pentane diol (molecular weight: 104.15) was used instead of PPG Diol 400. The decompositon product was formed into one liquid layer, and no solid precipitate was formed.

COMPARATIVE EXAMPLE 5

The decomposition reaction of Example 6 was repeated, except that diethylene glycol (molecular weight: 62.07) was used instead of PPG Diol 400. In this reaction, although tris(dichloropropyl) phosphate was contained in flame-resistant polyurethane foam B, a solid precipitate was not formed in the decomposition product, and black a viscous substance was merely formed in the lower layer of the decomposition product.

As can be seen from Comparative Examples 3-5, when an aliphatic diol having a low molecular weight is used, the decomposition product is formed into one liquid layer or two liquid layers, and no solid precipitate is formed. This shows that aliphatic diols having a molecular weight of at least 400 must be used in the present invention.

COMPARATIVE EXAMPLE 6

The decomposition reaction of Example 1 was repeated, except that an aliphatic triol, glycerin (molecular weight: 92.10), was used instead of PPG Diol 400. The decomposition product was formed into two liquid layers, and no solid precipitate was formed.

COMPARATIVE EXAMPLE 7

The decomposition reaction of Example 1 was repeated, except that Triol GP 3000 (aliphatic triol made by Sanyo Kasei Co., M.W.: 3,000) was used instead of PPG Diol 400. A very long decomposition time was required, and the experiment was stopped after lapse a of 5 hours.

It can be seen from Comparative Examples 6 and 7 that the solvent to be used in the present invention must be an aliphatic diol.

What is claimed is:

1. A method for recovering a polyol from a polyurethane which comprises dissolving a polyurethane in an aliphatic diol having a molecular weight of about 400 to 3000 and a boiling point of higher than 180° C and decomposing the polyurethane into the polyisocyanate employed in the production of the polyurethane, the polyol employed in the production of the polyurethane and a polyamine resulting from the dissociation of the urea bond in the polyurethane by heating the dissolved polyurethane at a temperature of about 170° to 250° C in the presence of a halogenated ester of phosphoric acid, with the weight ratio of the aliphatic diol to the halogenated ester of phosphoric acid being 1:1 to 20:1, wherein said halogenated ester of phosphoric acid is tris(chloroethyl) phosphate, tris(dichloropropyl) phosphate, tris(chloropropyl) phosphate, bis(2,3-dibromopropyl) phosphate or bis(chloropropyl) monophenyl phosphate, whereby the polyamine resulting from the dissociation of the urea bond in the polyurethane employed in the production of the polyurethane is precipitated as a solid amine derivative of phosphoric acid, and the polyol employed in the production of the polyurethane is recovered together with a polyol having a urethane bond formed by reaction of said polyisocyanate employed in the production of the polyurethane with said aliphatic diol as a liquid.

2. The method as claimed in claim 1, wherein said aliphatic diol is polyoxypropylene glycol.

3. The method as claimed in claim 1, wherein said halogenated ester of phosphoric acid is tris(dichloropropyl) phosphate.

4. The method as claimed in claim 1, wherein said halogenated ester of phosphoric acid is tris(chloroethyl) phosphate.

5. The method as claimed in claim 1, wherein the weight ratio of the aliphatic diol to the halogenated ester of phosphoric acid is 2.5:1 to 10:1.

6. The method as claimed in claim 1, wherein said aliphatic diol is polyoxypropylene glycol, polyoxypropylenepolyoxyethylene glycol or polyoxybutylene glycol.

* * * * *